(12) United States Patent
Saarinen et al.

(10) Patent No.: US 8,285,498 B2
(45) Date of Patent: Oct. 9, 2012

(54) METHOD FOR DETECTION AND AUTOMATIC IDENTIFICATION OF DAMAGE TO ROLLING BEARINGS

(75) Inventors: Kari Saarinen, Vasteras (SE); Jaroslaw Nowak, Krakow (PL)

(73) Assignee: ABB Research Ltd., Zurich (CH)

( * ) Notice: Subject to any disclaimer, the term of this patent is extended or adjusted under 35 U.S.C. 154(b) by 206 days.

(21) Appl. No.: 12/738,462

(22) PCT Filed: Oct. 17, 2008

(86) PCT No.: PCT/EP2008/008988
§ 371 (c)(1),
(2), (4) Date: Apr. 16, 2010

(87) PCT Pub. No.: WO2009/053076
PCT Pub. Date: Apr. 30, 2009

(65) Prior Publication Data
US 2010/0280772 A1    Nov. 4, 2010

(30) Foreign Application Priority Data
Oct. 24, 2007   (EP) .................................... 07460032

(51) Int. Cl.
*G06F 19/00* (2006.01)
(52) U.S. Cl. ................ 702/56; 73/570; 73/593; 73/602; 73/609; 73/660; 702/179

(58) Field of Classification Search ................. 702/56, 702/179; 73/593, 597, 602, 609, 646, 660, 73/570
See application file for complete search history.

(56) References Cited

U.S. PATENT DOCUMENTS

| 3,208,268 | A | | 9/1965 | Tallian et al. | |
| 5,477,730 | A | * | 12/1995 | Carter | 73/609 |
| 6,591,682 | B1 | * | 7/2003 | Lysen | 73/602 |

FOREIGN PATENT DOCUMENTS
WO   2000004361   1/2000

* cited by examiner

*Primary Examiner* — Jonathan C Teixeira Moffat
*Assistant Examiner* — Hien Vo
(74) *Attorney, Agent, or Firm* — Michael C. Prewitt; Melissa J. Szczepanik

(57) ABSTRACT

The subject of the invention is a method for detection and automatic identification of defects in rolling bearings applicable in diagnosing rolling bearings and detecting damage in a very early stage of its occurrence.

Figure 1:
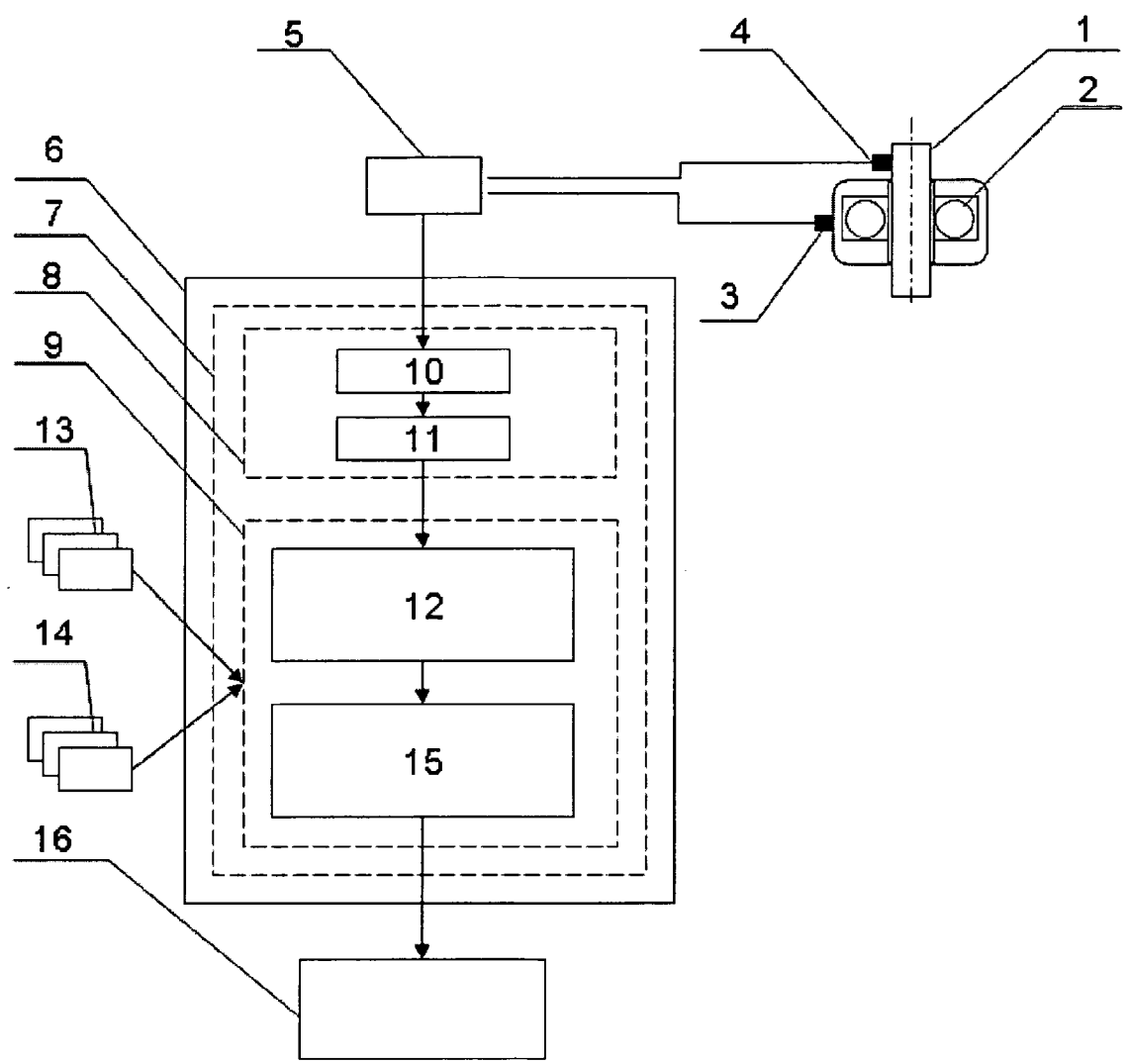

The inventive method in which the vibrations of a bearing in operation are measured, the measured analogue signals are converted to digital data which are filtered and next shock pulses are detected, whereupon defects present in the tested bearing or bearings are identified, characterized in that the detection of shock pulses is done using shock pulse likelihood ratio (Ms).

10 Claims, 6 Drawing Sheets

METHOD FOR DETECTION AND AUTOMATIC IDENTIFICATION OF DAMAGE TO ROLLING BEARINGS

The subject of the invention is a method for detection and automatic identification of damage to rolling bearings applicable in diagnosing rolling bearings and detecting damage in a very early stage of their occurrence.

BACKGROUND

In present-day methods of diagnosing technical equipment, the detection of existing faults and damage occurring in the early phase of the use of equipment or its individual parts and their accurate location are of paramount importance, and the sooner it can be done the greater the importance of the method. The diagnosing of the condition of equipment and especially the detection and automatic identification of defects in rotating electric machines and their parts makes use of methods based on measuring electric or mechanical signals, their processing as well as the analysis and interpretation of the results of the measurements.

The nowadays applied methods of monitoring bearings during operation consist in comparing the measured and digitally processed results with data obtained for bearings which operate in proper conditions and which are not in danger of any failure. In most cases such comparison is done by an expert trained for this purpose.

The most frequently used method for early determination of defects in bearings consists in the examination of shock pulses combined with the examination of vibrations in the tested parts of the bearing. Then, such shapes of the pulses are selected from the measured data for further analysis which suggest the possibility of the presence of a defect. Computerised methods of data analysis allow to detect faults early and to determine the place of their occurrence, their types and the degree of damage.

A method and a device for checking the condition of a rolling bearing is known from the patent description U.S. Pat. No. 5,477,730. The method consists in detecting the primary signals of vibrations emitted by the bearing, demodulation of these signals to output signals after demodulation, converting the output signals from analogue signals to digital output signals, filtering noise out of these signals by means of a digital filtration technology selected from many known technologies, and outputting the digital signals to an output device. In another variant of the invention, instead of the demodulation of primary signals, band-pass filtration within a range from 2000 to 15,000 Hertz is used, and the signals after this filtration are subjected to transformations as described earlier. In still another variant of the invention the primary vibration signals emitted by the bearing are converted from analogue to digital, whereupon noise is filtered off the signals using a digital filtration technology selected from many known technologies, which includes the action of separation of noise signals from the digital output signals, and then digital signals are introduced to the output device.

A method for evaluating the condition of the elements of a bearing is known from patent application WO 00/04361. This method employs the measurements of bearing element vibrations by generating an analogue acceleration signal, converting this signal into digital data, sampling the digital signal to locate its components coming from the bearing defect. The method is characterized in that the influence of any unwanted, deterministic signal components is removed from the digital acceleration signal by means of filtering so as to obtain a signal consisting essentially of white noise proportional to overall smoothness of the microstructure of the bearing surface and shock pulse. The following signal characteristic parameters that are sensitive to the bearing defects are selected: sharp vibration pulses or shock pulses, peak-to-peak amplitude a mean value proportional to the mean amplitude without shock pulses a peak content of the signal. Detection of narrow-band shock pulses in regular intervals is done using a known method, so called autocorrelation of the envelope signal estimation.

SUMMARY OF THE INVENTION

The essence of the method for detection and automatic identification of damage to rolling bearings, in which vibrations of a bearing in operation, measured as an analogue timewave signal is converted into digital data and prefiltered in a known way, is that the detection of the shock pulses is performed with use of the binary vector p that is determined in the following actions:

in the prefiltered timewave of the processed signal two first, adjacent vector intervals are selected: a reference interval and a test interval and the signal present in the test and reference intervals are subjected to multiple filtering whereupon after each filtering, the shock pulse likelihood ratios are calculated defined as a ratio of mean square values of filtered signal present in the test interval to the mean square values of filtered signal present in the reference interval, calculated likelihood ratios are compared with the preset threshold value and the probability of shock pulse occurrence in the first test interval is estimated, information about shock pulse occurrence in examined test interval is recorded as initial elements of binary vector p, and next all remaining elements of the binary vector p are determined for all successive test and reference intervals that are selected iteratively with an offset in a specific direction and those elements of binary vector p take on the values 1 in the area of shock pulse occurrence and 0 in the area where the shock pulse does not occur.

Preferably mean square value of the signal in the examined test interval subjected to $L^{th}$ filtering $\tau_t[L]$ is determined on the basis of the following relation:

$$\tau_t[L] = \frac{1}{K_t} \sum_{k_t=1}^{K_t} z_t^L[k_t]^2,$$

whereas the mean square value of the signal in the examined reference interval subjected to $L^{th}$ filtering $\tau_r[L]$ is determined on the basis of this relation:

$$\tau_r[L] = \frac{1}{K_r} \sum_{k_r=1}^{K_r} z_r^L[k_r]^2,$$

where:
L—is a natural number from the range $1 \ldots N_S$ and denotes the number of filters,
$k_t$, $k_r$ denotes successive natural numbers 1 to $K_t$ or to $K_r$,
$z_t^L$, denotes a vector representing the examined test interval of the signal subjected to $L^{th}$ filtering,
$z_r^L$ denotes a vector representing the examined reference interval of the signal subjected to $L^{th}$ filtering.

Preferably the mean square value of a signal in the examined reference interval $\tau_r[L]$ is determined using $L^{th}$ filtering, that is an adaptive filtering, with use of Singular Value Decomposition (SVD) of autocovariance matrix $C_r$, according to the following relation:

$$C_r = V\Sigma_r U^T,$$

where matrix $\Sigma_r$ is a diagonal matrix whose diagonal elements are nonzero and nonnegative and denote mean square values $\tau_r[L]$:

$$\Sigma_r = \begin{bmatrix} \tau_r[1] & 0 & \cdots & 0 \\ 0 & \tau_r[2] & \cdots & 0 \\ \vdots & \vdots & \ddots & \vdots \\ 0 & 0 & \cdots & \tau_r[L] \end{bmatrix},$$

and matrices V and U are orthogonal matrices and at the same time the autocovariance matrix $C_r$ has the following form:

$$C_r = \begin{bmatrix} r[1] & r[2] & \cdots & r[L] \\ r[2] & r[0] & \cdots & r[L-1] \\ \cdots & \cdots & \cdots & \cdots \\ r[L] & r[L-1] & \cdots & r[1] \end{bmatrix},$$

for which:

$$r[i_r] = \frac{1}{K_r} \sum_{k_r=1}^{K_r} x_r[k_r] x_r[k_r + i_r]$$

where:
$x_r[k_r]$ are the elements of the reference interval,
$k_r$ denotes successive natural numbers from 1 to $K_r$,
$i_r$ denotes successive natural numbers from 1 to $L$,
$K_r$ denotes the length of the reference interval,
L denotes the number of adaptive filters.

Preferably the mean square value of a signal in the examined test interval $\tau_t[L]$ is determined using $L^{th}$ filtering, that is an adaptive filtering, on the basis of the following relation:

$$\tau_t[L] = \frac{1}{N_t} \sum_{k_t=1}^{N_t} z_t^L[k_t]^2,$$

where $z_t^L$ are the elements of the matrix $Z_t$ presented in the following form:

$$Z_t = \begin{bmatrix} z_t^1[1] & z_t^1[2] & \cdots & z_t^1[N_t] \\ z_t^1[2] & z_t^1[3] & \cdots & z_t^1[N_t + 1] \\ \vdots & \vdots & \ddots & \vdots \\ z_t^L[L_t] & z_t^L[L_t + 1] & \cdots & z_t^L[K_t] \end{bmatrix},$$

and calculated according to the following relation:

$$Z_t = X_t U,$$

where matrix $X_t$ is defined as:

$$X_t = \begin{bmatrix} x_t[1] & x_t[2] & \cdots & x_t[N_t] \\ x_t[2] & x_t[3] & \cdots & x_t[N_t + 1] \\ \vdots & \vdots & \ddots & \vdots \\ x_t[L_t] & x_t[L_t + 1] & \cdots & x_t[K_t] \end{bmatrix},$$

and matrix U is an orthogonal matrix whose elements are the adaptive filter coefficients, while:
$K_t$ denotes the length of the examined test interval;
$x_t[k_t]$, are the elements of the test interval;
$k_t$ denotes the successive natural numbers from 1 to $K_t$,
$N_t = K_t - L$,
L denotes the number of adaptive filters.

Preferably the multiple filtering of signals in the test and reference intervals is performed with use of band pass filter Preferably the length of the test interval is 15% of the length of the reference interval Preferably the identification of the defect in the bearing or bearings is done automatically for the binary vector p determined for all examined test and reference intervals of the timewave X of the processed signal and the set of known defect frequencies of examined bearing or bearings $F_f = [f_{f1}, f_{f1}, \ldots, f_{fK}]$, by means of the following actions:

for each successive, known defect frequency $f_{fK}$ from the set $F_f$ of the examined bearing, the test frequency $v_{fK} \in \lfloor (1-P_g) f_{fK}, (1+P_g)f_{fK} \rfloor$ that belongs to the neighbourhood $P_g$ of the frequency $f_{fK}$ is determined, where $P_g$ is a configuration parameter denoting the searching frequency range related to known defect frequency and next, using known maximum likelihood mathematical principles, for each test frequency $v_{fK}$ the maximum likelihood function J in time domain is determined using the binary vector p, next, it is checked for which test frequency $v_{fK}$ the maximum likelihood function J reaches the maximum value $J_A$, the ratio $F_A$ of the maximum value $J_A$ to the noise level $n_A$ is calculated and the result is compared with the preset threshold parameter $S_A$:

if the ratio $F_A$ is greater than the preset threshold parameter $S_A$, information about examined bearing defect with specific frequency that belongs to set $F_t$ and corresponds to test frequency $v_{fK}$ generated automatically, if the ratio $F_A$ is less than or equal to the preset threshold parameter $S_A$, it is assumed that none of the shock pulses present in the binary vector p corresponds to any of known defect frequencies $f_{fK}$ of examined bearings and information that no specific defect occurred in the examined bearing or bearings is generated automatically.

Preferably the test frequency $v_{fK}$, for which the maximum likelihood function calculated for the binary vector p in time domain reaches the maximum value $J_A$, is determined by maximising the sum of squares of harmonic amplitudes $A_k$ according to the following relation:

$$J_A = \sum_{k=1}^{N_h} [A_k]^2,$$

where: $N_h$ is a preset number of the examined harmonics.
Preferably values of the amplitudes of harmonics $A_k$ are determined in time domain using the binary vector p, presented in the form of the sinusoidal model.

The binary vector p is presented as a sum of sinusoidal model and the noise vector:

$$p[n] = \sum_{k=1}^{N_h} [A_k \cos(n\omega_k)\cos(\phi_k) - A_k \sin(n\omega_k)\sin(\phi_k)] + \varepsilon[n],$$

which can be also presented in the following matrix form:

$$p = B\theta + e$$

where:
- $\phi_k$ is a phase,
- $\omega_k = 2\pi v k/f_s$, k=1, 2 ... $N_h$ is an angular velocity corresponding to a test frequency ($v_{fK}$), and k=1, 2 ... $N_h$,
- $f_s$ is a sampling frequency for analogue to digital processing of measured analogue signal,
- $e = [\varepsilon[n]]^T$—denotes the noise vector,
- n—denotes a natural number from 1 to N−1,
- N—denotes number of elements in the binary vector (p),
- B is the matrix of known constant parameters, presented in the following form:

$$B = \begin{bmatrix} 1 & 0 & 1 & 0 & \ldots & 1 & 0 \\ \cos(\omega_1) & -\sin(\omega_1) & \cos(\omega_2) & -\sin(\omega_2) & \ldots & \cos(\omega_{N_h}) & -\sin(\omega_{N_h}) \\ \cos(\omega_1 2) & -\sin(\omega_1 2) & \cos(\omega_2 2) & -\sin(\omega_2 2) & \ldots & \cos(\omega_{N_h} 2) & -\sin(\omega_{N_h} 2) \\ \vdots & \vdots & \vdots & \vdots & & \vdots & \vdots \\ \cos(\omega_1(N-1)) & -\sin(\omega_1(N-1)) & \cos(\omega_2(N-1)) & -\sin(\omega_2(N-1)) & \ldots & \cos(\omega_{N_h}(N-1)) & -\sin(\omega_{N_h}(N-1)) \end{bmatrix}$$

and θ is the vector of unknown parameters presented in the following form:
$\theta = [A_1 \cos(\phi_1), A_1 \sin(\phi_1), A_2 \cos(\phi_2), A_2 \sin(\phi_2), \ldots, A_{N_h} \cos(\phi_{N_h}), A_{N_h} \sin(\phi_{N_h})]$,
which is the Least Square Estimator for the relation:

$$\theta = (B^T B)^{-1} B^T p$$

where p is a binary vector in the following form:
$p = [p[0], p[1], \ldots, p[N-1]]^T$.

Preferably the noise level $n_A$ is calculated by taking a median value of maximum function values J found in the neighbourhood of the examined defect frequency $f_{fK}$ from the set $F_f$.

Alternatively the noise level $n_A$ is calculated by taking a mean value of maximum function values J found in the neighbourhood of the examined defect frequency $f_{fK}$ from the set $F_f$.

Compared with the known methods of the detection and automatic identification of defects in rolling bearings, the inventive solution allows the detection of defects in a very early phase of their emergence. Measured signal is processed so that non-shock pulse related signal components are removed from it on the basis of adaptive filtering combined with shock pulse likelihood ratio calculation in a specific test and reference intervals. Moreover, detection of each potential shock pulse is performed in the time domain, individually, one at the time in contrary to other techniques where the shock pulse detection is based on the analysis of demodulated signal in the frequency domain. In consequence the sensitivity of inventive solution is increased. As a result of shock pulse detection algorithm, the binary vector p is created that contains only shock pulse related signal components. For the bearing fault identification, the binary vector p is processed in the time domain with high resolution maximum likelihood method. There is no Fourier transform used in the fault identification process at all.

BRIEF DESCRIPTION OF THE DRAWING FIGURES

Figure 2:
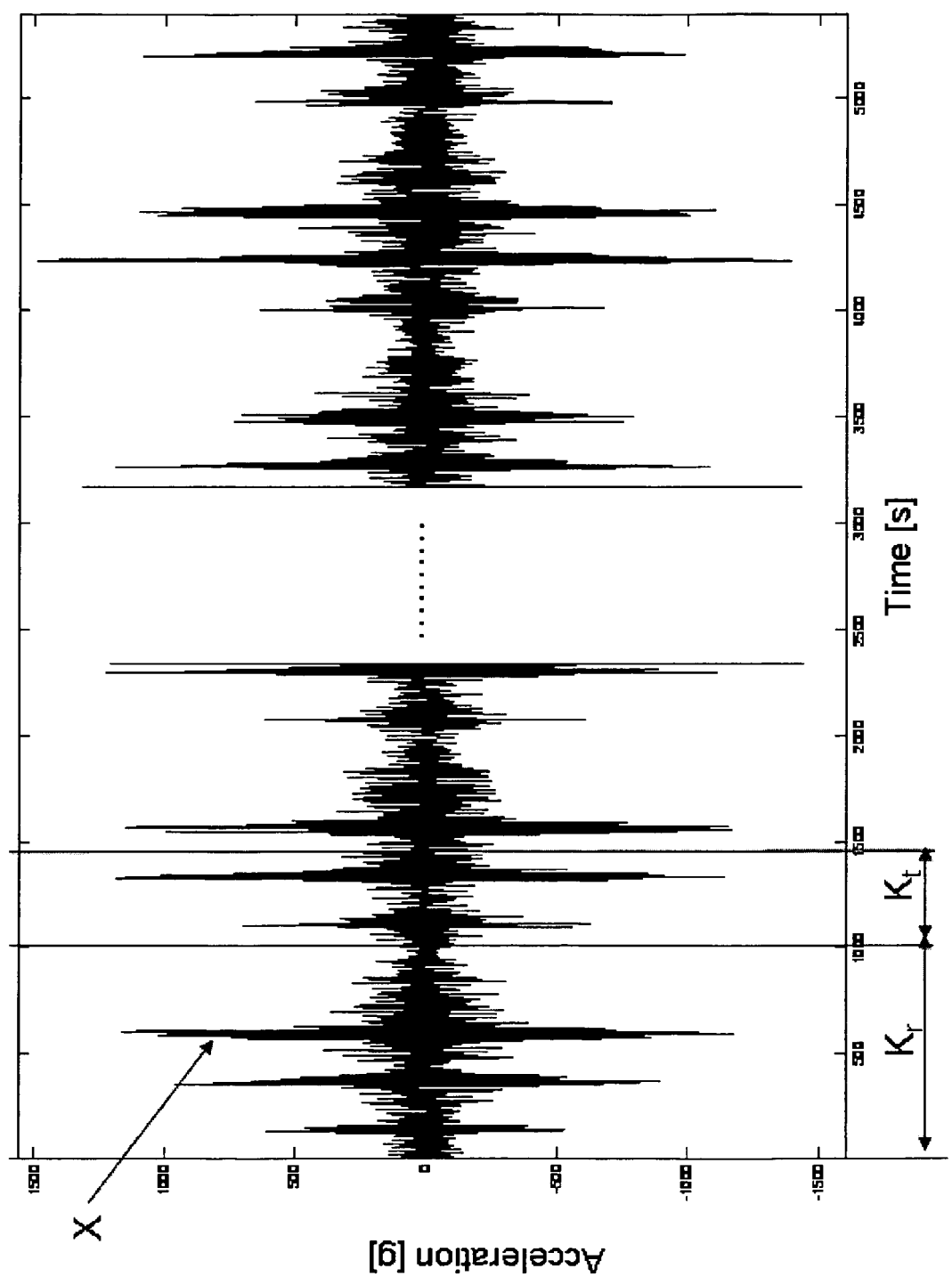
Figure 3:
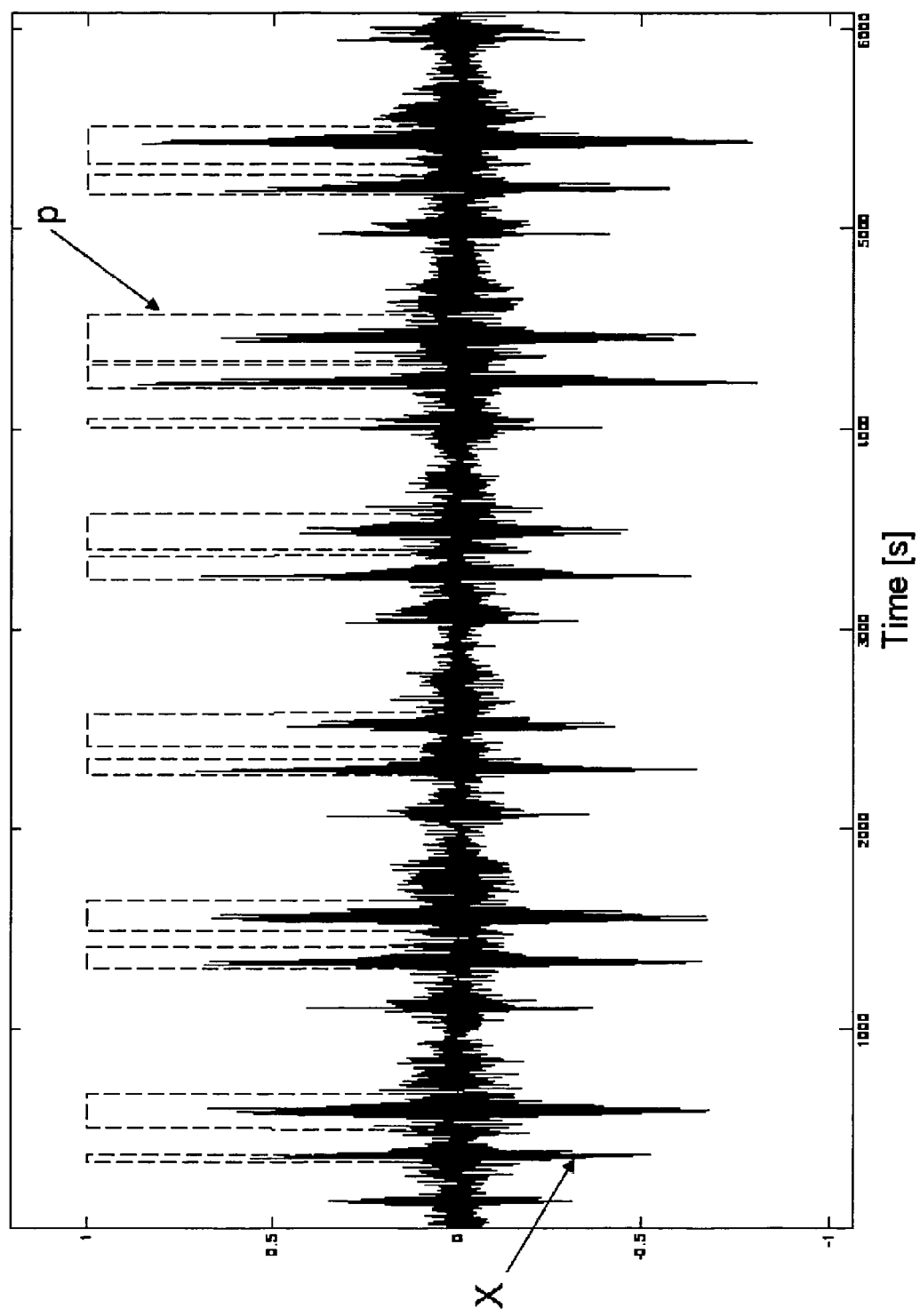
Figure 4:
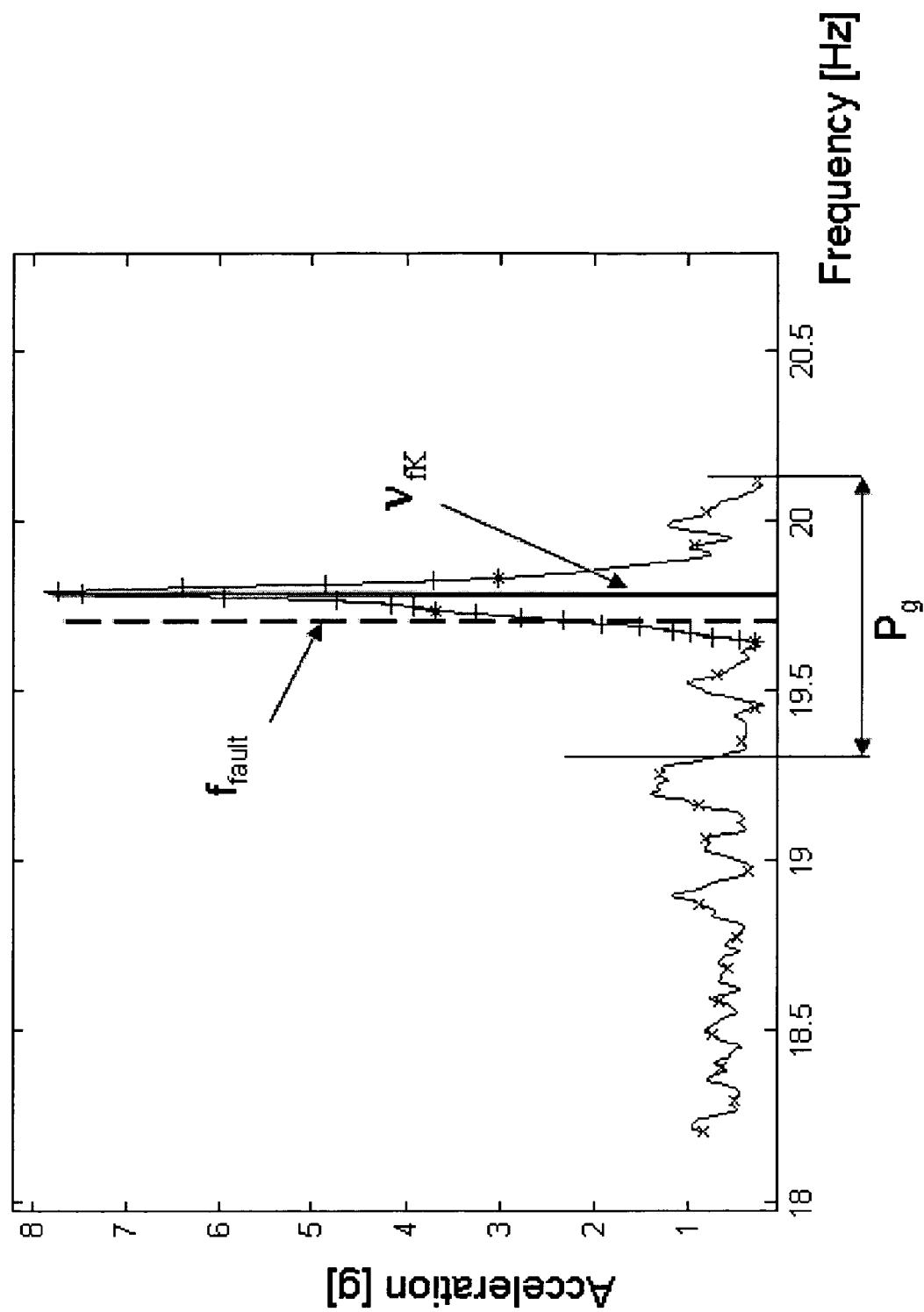
Figure 5:
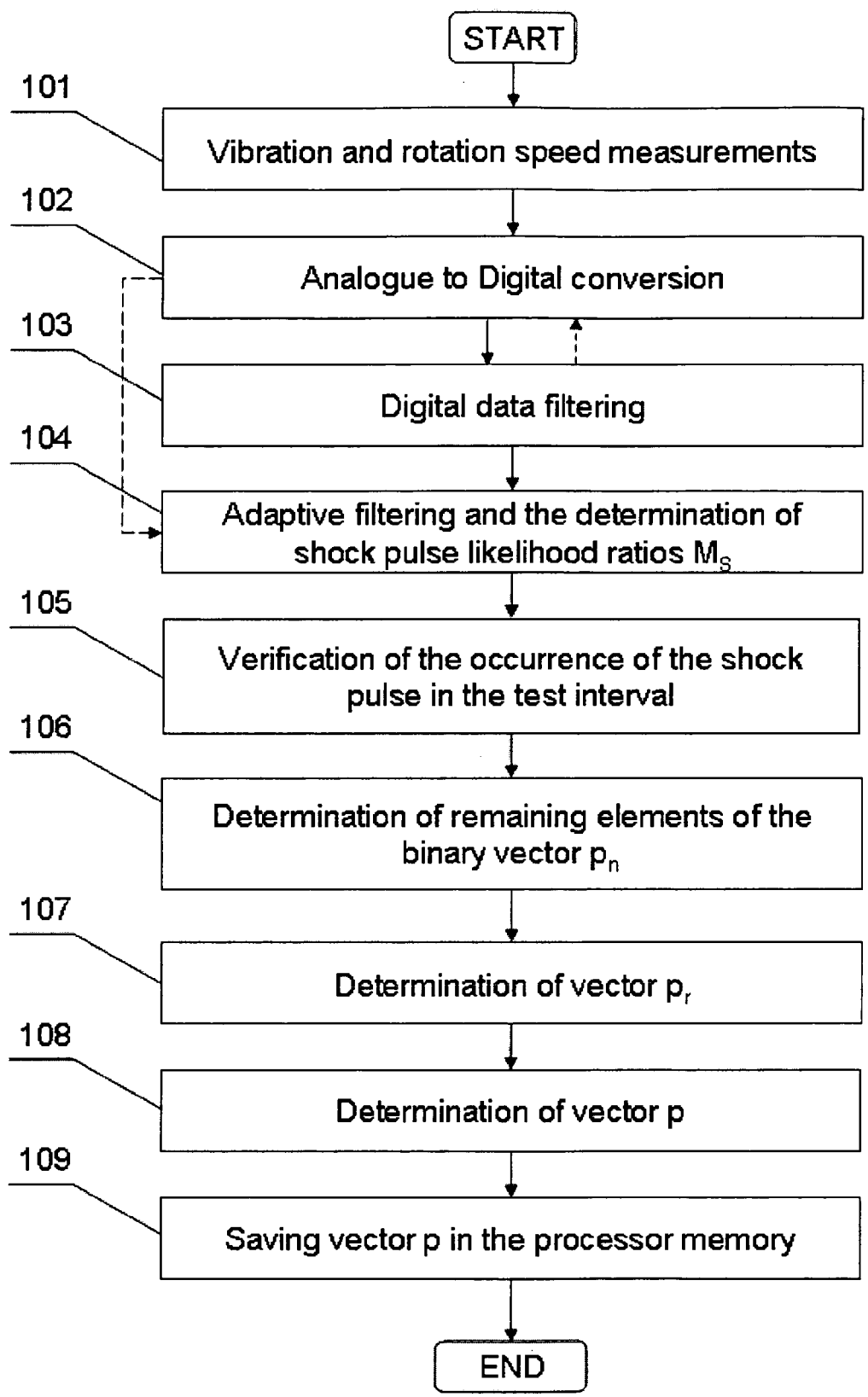
Figure 6:
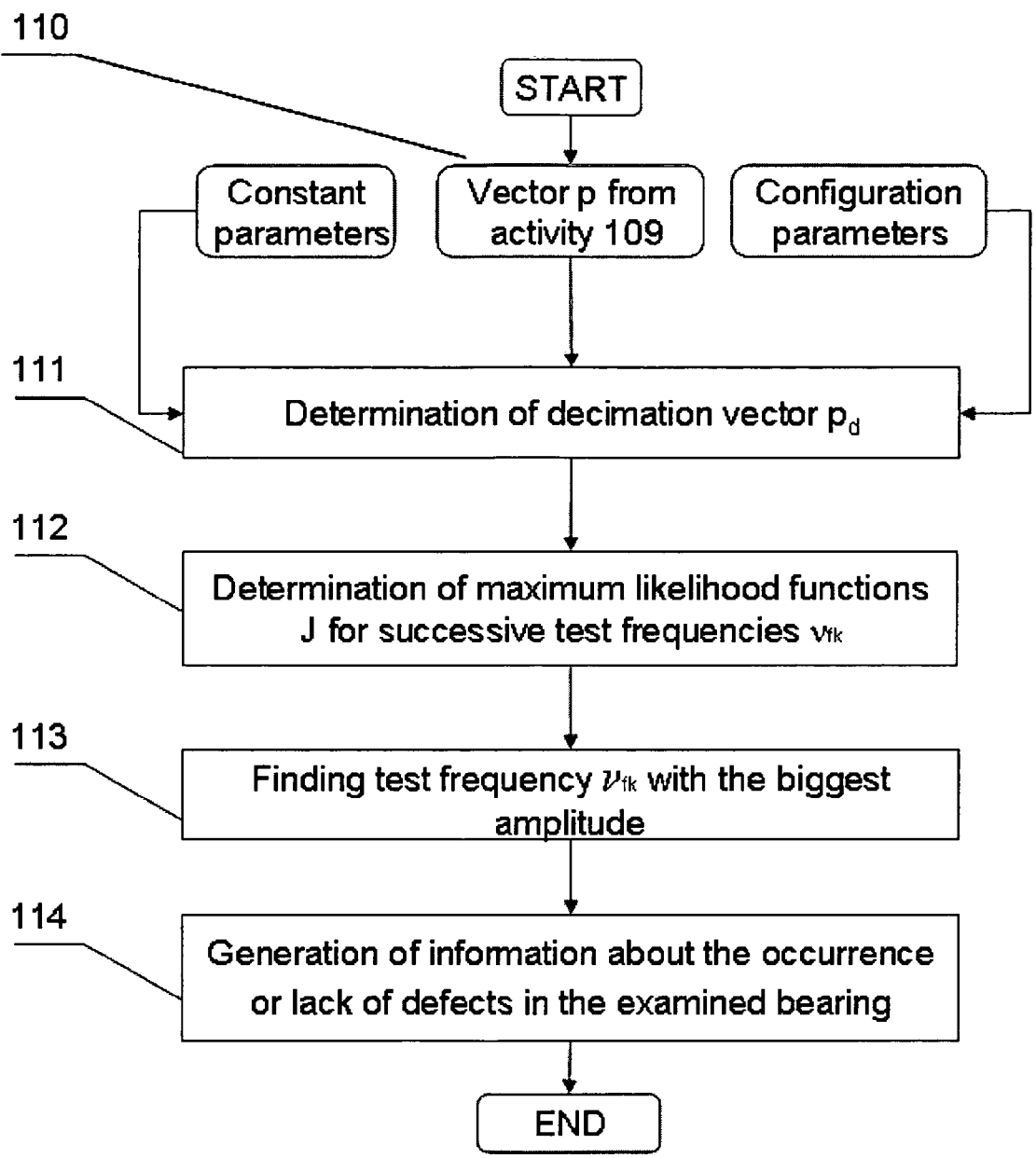

FIG. 1 shows a block diagram of the device used for detecting and automatically identifying defects in rolling bearings, FIG. 2 shows a timewave of a processed signal X with indicated test and reference intervals, FIG. 3 shows the graph of the course of occurrence of shock pulses in the binary form against the background of a time pass of the processed signal X, FIG. 4 shows a fragment of the frequency spectrum in which the defect frequency $f_{fault}$ has been indicated, FIG. 5 shows a diagram of operations performed when detecting shock pulses according to the presented method and FIG. 6 shows a diagram of operations performed when identifying defects in bearings according to the presented method.

DETAILED DESCRIPTION OF THE INVENTION

Placed on a rotating shaft 1, a rolling bearing 2 comprises measuring points, marked on its housing, where a vibration sensor 3 is placed for measuring the bearing vibrations and the shaft 1 speed sensor 4. The sensors are connected to a measuring device 5 used to measure the analogue signal of voltage proportional to the vibrations of the operating bearing 2 and to measure the rotational speed of the shaft. The output of the measuring device 5 is connected to the input of a processor 6 in whose memory 7, a processing module 8 and a function module 9 can be distinguished. The processing module 8 incorporates a processing system 10 in which the measured signal is converted to a digital signal which is then sent as input data to a high pass filtering system 11 also incorporated in the module 8, wherein the signal components unwanted in further analysis are filtered off. Output data received from the system 11 are fed to a shock pulse detector 12 which makes one of the systems of the function module 9 of the processor 6. Configuration data 13 related mathematical calculations performed in the function module 9 and input data 14 which are the known frequencies of the defects of the tested rolling bearings 2 are also fed to the function module 9. Output data from the system of the shock pulse detector 12 are transmitted to a fault identifier 15 which belongs to the function module 9 and in which the identification of the defects of rolling bearings is performed. The output of the processor 6 is connected with a device for visualising and/or recording the obtained results 16, which can be a computer display, a printer or any carrier for data recording.

The inventive method is implemented according to the following actions shown in FIG. 6.

Vibration and rotation speed measurement. By means of the vibration sensor 3 and the measuring device 5 the vibrations of the operating rolling bearing 2 are measured in the indicated measuring points 3, and by means of the speed sensor 4 and the measuring device 5 the rotational speed of the bearing-supported shaft 1 is measured 1—(activity 101).

Analogue to digital conversion. The results of the measurements are converted from the analogue form to digital data in the processing unit 10, or in the measuring device 5, and then these results are stored in the digital form in the memory 7 of the processor 6 of the computer device as the signal timewave—(activity 102).

Digital data filtering. The stored data are prefiltered in the high pass filtering system 11 producing a timewave X, where X=x[k, k+1, k+2, k+K], where k denotes successive time samples of a processed signal from the range of 1 to K. As the high pass filtering system, a FIR (Finite Impulse Response) filter can be used, for example. The characteristic feature of the FIR filter is that its response to a given sequence of input samples has a finite length. The purpose of data filtration is to remove signals of a frequency lower than a preset limit constituting one of the configuration parameters—(activity 103).

Adaptive filtering and the determination of shock pulse likelihood ratios $M_S$. Data obtained as a result of prefiltering are transmitted to the shock pulse detector 12 in which the signal timewave undergo adaptive filtering and the shock pulse likelihood ratios $M_S$ are determined. In the shock pulse detector 12, in the prefiltered timewave X, adjacent reference interval of a length of $K_r$ and a test interval of a length of $K_t$ are selected, the length $K_r$ of the reference interval being less than the time distance between two successive shock pulses generated by the same type of bearing defect, and the length of the test interval $K_t$ being less than or equal to at least half of the length of the reference interval. Preferably it is assumed that the length of the test interval makes 15% of the length of the reference interval. Next, a definite number of filters $N_S$ is assumed, preferably $N_S$=5 and for each $L^{th}$ filtering, where L is a natural number from the range of 1 to $N_S$, the adaptive filtering of a signal from the test and reference intervals is performed, after which for each $L^{th}$ filtering the shock pulse likelihood ratio $M_S$ is calculated according to the following relation—(activity 104):

$$M_S = \frac{\tau_t[L]}{\tau_r[L]}, \quad (1)$$

where $\tau_t[L]$ is the mean square value of the signal in the examined test interval subjected to $L^{th}$ adaptive filtering, defined in the following form:

$$\tau_t[L] = \frac{1}{K_t} \sum_{k_t=1}^{K_t} z_t^L[k_t]^2, \quad (2)$$

and $\tau_r[L]$ is mean square value of the signal in the examined reference interval subjected to $L^{th}$ adaptive filtering, defined in the following form:

$$\tau_r[L] = \frac{1}{K_r} \sum_{k_r=1}^{K_r} z_r^L[k_r]^2, \quad (3)$$

where:
L—is a natural number from the interval 1 . . . $N_S$ and denotes the number of adaptive filters,
K—is the total length of the examined timewave of processed signal,
$K_t$, $K_r$ are the lengths of the test and reference intervals, respectively,
$k_t$, $k_r$ are the successive natural numbers from 1 to $K_t$ or to $K_r$,
$z_t^L$, denotes a vector representing the examined test interval of the signal subjected to $L^{th}$ adaptive filtering,
$z_r^L$ denotes a vector representing the examined reference interval of the signal subjected to $L^{th}$ adaptive filtering.

Verification of the occurrence of the shock pulse in the test interval. For each $L^{th}$ adaptive filtering the value of shock pulse likelihood ratio $M_S$ is compared with a preset threshold value $S_L$, previously supplied to the computer device memory, and if the likelihood ratio $M_S$ is bigger than $S_L$ in at least $S_1$ filters, this means that an shock pulse occurred in the examined test interval, whereas if likelihood ratio $M_S$ is bigger than $S_L$ in less than $S_1$ filters, this means that an shock pulse did not occur in the examined test interval, the occurrence of the shock pulse in the test interval being recorded in a binary form as a vector $p_n$, by filling the initial elements of the vector $p_n$ with the numbers "1" or the numbers "0" for non-occurrence of an shock pulse—(action 105).

Determination of remaining elements of the binary vector $p_n$. In the timewave X of the processed signal, successive adjacent test and reference intervals offset in relation to those previously determined by a preset step are iteratively determined and activities connected with adaptive filtering, determination of shock pulse likelihood ratios $M_S$ for all successive test intervals, for a preset filtering number $N_S$, and verification of the occurrence of an shock pulse for all intervals of the whole timewave X of the processed signal are repeated and thus the remaining elements of the binary vector $p_n$ are obtained. The binary vector $p_n$ is stored in the memory 7 of the processor 6 as a binary timewave which takes on the values 1 in the area of shock pulses occurrence and 0 in the area where shock pulses do not occur—(activity 106).

Determination of the vector $p_r$. A reversion of the order of the time samples in the stored, prefiltered timewave X of the processed signal of the test and reference intervals is performed and for such a reversed signal timewave all previous activities from 104 to 106 are performed as before and the information on shock pulses presence is stored as a binary vector $p_r$, where the value 1 denoting the presence of an shock pulse for the given time sample, and the value 0 denoting its absence (activity 107).

Determination of the vector p. The order of the elements in the binary vector $p_r$ is reversed and summed up logically with the vector $p_n$ in order to obtain the binary vector p. The binary vector p is stored in the memory 7 of the processor 6 (activity 109) as a binary time wave which takes on the values 1 in the area of shock pulse occurrence and 0 in the area where shock pulses do not occur (activity 108).

Saving the vector p in the processor memory. The obtained results are stored in special equipment 18—(activity 109).

Then the elements of the vector p are used as preliminary data for the automatic identification of bearing defects—(activity 110).

In order to determine the mean square value of the signal in the reference interval $\tau_r[L]$, subjected to the $L^{th}$ adaptive filtering, which is necessary to determine the shock pulse likelihood ratio $M_S$, mathematical relations are used in which the autocovariance matrix $C_r$ is defined as the relation between orthogonal matrices V and $U^T$ and of the matrix $\Sigma_r$.

The diagonal elements of the matrix $\Sigma_r$ are nonzero, nonnegative and they denote mean square values $\tau_r[L]$. This relation is shown in the following formula:

$$C_r = V\Sigma_r U^T \quad (4)$$

where the matrix $\Sigma_r$ is defined by the following relation:

$$\sum_r = \begin{bmatrix} \tau_r[1] & 0 & \ldots & 0 \\ 0 & \tau_r[2] & \ldots & 0 \\ \vdots & \vdots & \ddots & \vdots \\ 0 & 0 & \ldots & \tau_r[L] \end{bmatrix}. \quad (5)$$

At the same time the autocovariance matrix $C_r$ is defined as follows:

$$C_r = \begin{bmatrix} r[1] & r[2] & \ldots & r[L] \\ r[2] & r[0] & \ldots & r[L-1] \\ \ldots & \ldots & \ldots & \ldots \\ r[L] & r[L-1] & \ldots & r[1] \end{bmatrix}, \quad (6)$$

for which:

$$r[i_r] = \frac{1}{K_r}\sum_{k_r=1}^{K_r} x_r[k_r]x_r[k_r+i_r]$$

where:
$x_r[k_r]$ are the elements of the reference interval,
$k_r$ denotes successive natural numbers from 1 to $K_r$,
$i_r$ denotes successive natural numbers from 1 to $L$,
$K_r$ denotes the length of the reference signal.

As a result of the comparison of the relations 4 and 6, using the singular value decomposition of the autocovariance matrix Singular Value Decomposition (SVD), the mean square value of the signal in the reference interval $\tau_r[L]$ is obtained.

Next, in order to determine the mean square value of a signal in the test interval $\tau_t[L]$, subjected to the $L^{th}$ adaptive filtering, which value is necessary to determine the shock pulse likelihood $M_S$, the following mathematical relations are used:

$$\tau_t[L] = \frac{1}{N_t}\sum_{k_t=1}^{N_t} z_t^L[k_t]^2, \quad (7)$$

where $z_t^L$ are the elements of the matrix $Z_t$ presented in this form:

$$Z_t = \begin{bmatrix} z_t^1[1] & z_t^1[2] & \ldots & z_t^1[N_t] \\ z_t^1[2] & z_t^1[3] & \ldots & z_t^1[N_t+1] \\ \vdots & \vdots & \ddots & \vdots \\ z_t^L[L_t] & z_t^L[L_t+1] & \ldots & z_t^L[K_t] \end{bmatrix}, \quad (8)$$

and calculated according to this relation:

$$Z_t = X_t U \quad (9),$$

where the matrix $X_t$ is defined as:

$$X_t = \begin{bmatrix} x_t[1] & x_t[2] & \ldots & x_t[N_t] \\ x_t[2] & x_t[3] & \ldots & x_t[N_t+1] \\ \vdots & \vdots & \ddots & \vdots \\ x_t[L_t] & x_t[L_t+1] & \ldots & x_t[K_t] \end{bmatrix}, \quad (10)$$

and the matrix U is an orthogonal matrix whose elements are the coefficients of adaptive filtering, whereas:
$K_t$ denotes the length of the examined test interval;
$x_t[k_t]$ are the elements of the test interval;
$k_t$ denotes successive natural numbers from 1 to $K_t$,
$N_t = K_t - L$.

Then, the identification of the defect in a bearing or bearings is done automatically in the defect identifier 15 for a binary vector p determined by means of the inventive method and for the base of input data which are known fault frequencies of examined bearing or bearings $F_f = (f_{f1}, f_{f2}, \ldots f_{fK})$, making use of the following activities depicted in FIG. 6.

A binary decimation vector $p_d$ is determined by subjecting the binary vector p to decimation with a preset decimation coefficient, in order to obtain the binary decimation vector $p_d$—(activity 111).

Maximum likelihood functions J are determined for successive frequencies $f_{fK}$ of the defects in the tested bearing. For each successive defect frequency $f_{fK}$ from the set $F_f$, of the tested bearing, the test frequency $v_{fK} \in [(1-P_g)f_{fK}, (1+P_g)f_{fK}]$ is determined roughly and then precisely from the neighbourhood $P_g$ of the frequency $f_{fK}$, where $P_g$ is a configuration parameter denoting the range of search in relation to the given defect frequency. Next, using known mathematical methods, the maximum likelihood function J is determined for each such test frequency $v_{fK}$ using the binary decimation vector $p_d$—(activity 112).

Searching for the shock pulse with the biggest amplitude. The maximum value $J_A$ of the maximum likelihood function J is determined by checking for which test frequency $v_{fK}$ the likelihood function J reaches the maximum value $J_A$ (activity 113).

Generation of information about the occurrence or lack of defects in the examined bearing. The ratio $F_A$ of the maximum value $J_A$ to the noise level $n_A$ is calculated and its result is compared with the preset threshold parameter $S_A$. If the ratio is bigger than the preset threshold parameter $S_A$, then information that a specific defect has occurred in the examined bearing, for example $f_{f1}$, corresponding to the test frequency $v_{fK}$, is automatically generated.

When the ratio $F_A$ is less than or equal to the preset threshold parameter $S_A$, it means that none of the found shock pulses presented in the form of a binary vector corresponds to the examined frequency which would be similar to the test frequency of the defects of the tested bearings, and then information that no specific defect occurred in the tested bearing or bearings is automatically generated—(activity 114).

In order to determine the maximum value $J_A$ of the maximum likelihood function J the following mathematical relations are used:

$$J_A = \sum_{k=1}^{N_h} [A_k]^2, \quad (11)$$

where: $N_h$ is the preset number of the examined harmonics, and $A_k$ is a harmonic amplitude determined in the time domain using the binary vector p, presented in the form of sinusoidal model.
The binary vector p is presented as a sum of sinusoidal model and the noise vector:

$$p[n] = \sum_{k=1}^{N_h} [A_k \cos(n\omega_k)\cos(\phi_k) - A_k \sin(n\omega_k)\sin(\phi_k)] + \varepsilon[n], \quad (12)$$

which can be also presented in the following matrix form:

$$p = B\theta + e \quad (13),$$

where:
$\phi_k$ is a phase,
$\omega_k = 2\pi v k/f_s$, $k=1, 2 \ldots N_h$ is angular velocity corresponding to a specific frequency ($v$), a $k=1, 2 \ldots N_h$,
$f_s$ is the sampling frequency of the measured analogue signal when analogue-digital conversion is performed,
$e = [\varepsilon[n]]^T$—denotes the noise vector,
n—denotes a natural number from 1 to N−1,
N—denotes the number of elements in the binary vector p,
B is the matrix of known constant parameters, presented in the following form:

$$B = \begin{bmatrix} 1 & 0 & 1 & 0 & \ldots & 1 & 0 \\ \cos(\omega_1) & -\sin(\omega_1) & \cos(\omega_2) & -\sin(\omega_2) & \ldots & \cos(\omega_{N_h}) & -\sin(\omega_{N_h}) \\ \cos(\omega_1 2) & -\sin(\omega_1 2) & \cos(\omega_2 2) & -\sin(\omega_2 2) & \ldots & \cos(\omega_{N_h} 2) & -\sin(\omega_{N_h} 2) \\ \vdots & \vdots & \vdots & \vdots & & \vdots & \vdots \\ \cos(\omega_1(N-1)) & -\sin(\omega_1(N-1)) & \cos(\omega_2(N-1)) & -\sin(\omega_2(N-1)) & \ldots & \cos(\omega_{N_h}(N-1)) & -\sin(\omega_{N_h}(N-1)) \end{bmatrix}, \quad (14)$$

and $\theta$ is the vector of unknown parameters, presented in the following form: $\theta = \lfloor A_1 \cos(\phi_1), A_1 \sin(\phi_1), A_2 \cos(\phi_2), A_2 \sin(\phi_2), \ldots, A_{N_h} \cos(\phi_{N_h}), A_{N_h} \sin(\phi_{N_h}) \rfloor$,
which is Least Square Estimator for this relation:

$$\theta = (B^T B)^{-1} B^T p \quad (15),$$

where p is a binary vector in this form:
$p = [p[0], p[1], \ldots, p[N-1]]^T$.
The comparison of the relations 12 and 13 allows to obtain values of harmonic amplitudes $A_k$, necessary to calculate the ratio $J_A$ which is then used to determine the place of defect occurrence, i.e. which bearing may be defective, and the type of the occurring defect.
The noise level $n_A$ is calculated using the median or mean values of the maximum function J found in the neighbourhood of the examined defect frequency $f_{fK}$.
The final result of the performed activities is the automatic generation of information about the presence or absence of defects in the examined bearing or bearings. The occurrence of a defects causes an automatic generation of information which of the examined bearings has been damaged and what is the type of the defect.

The invention claimed is:
1. An method for detection and automatic identification of damage to rolling bearings, in which vibrations of a bearing in operation, measured as an analogue timewave signal, are converted into digital data and prefiltered, wherein the detection of shock pulses are performed with use of a binary vector (p) that is determined in the following actions: selecting a first and second adjacent vector intervals in the prefiltered digital timewave data, said first adjacent vector intervals being a reference interval and said second adjacent vector interval being a test interval, filtering the signal in said test interval and said reference interval multiple times whereupon after each filtering a shock pulse likelihood ratio is calculated as a ratio of mean square values of filtered signal present in said test interval to the mean square values of filtered signal present in said reference interval, comparing said likelihood ratios with a preset threshold value and the probability of shock pulse occurrence in the first test interval is estimated, recording information about shock pulse occurrence in said test interval as initial elements of binary vector (p), wherein if said likelihood ratio is greater than said preset threshold value, the elements of the binary vector (p) take the value 1 and if said likelihood ratio is less than said preset threshold value, the elements of the binary vector (p) take the value 0, and thereafter determining all remaining elements of the binary vector (p) for all successive test and reference intervals that are selected iteratively with an offset in a specific direction, wherein the identification of the defect in the bearing or bearings is done automatically for the binary vector (p) determined for all examined said test intervals and said reference intervals of timewave (X) of the processed signal and the set of known defect frequencies of examined bearing or bearings $((F_f) = [f_{f1}, f_{f1}, \ldots f_{fK}])$, by means of the following actions:

for each successive, known defect frequency ($f_{fK}$) from a set ($F_t$) of the examined bearing, a test frequency ($v_{fK} \in \lfloor (1-P_g)f_{fK}, (1+P_g)f_{fK} \rfloor$) that belongs to a neighbourhood ($P_g$) of the frequency ($f_{fK}$) is determined, where ($P_g$) is a configuration parameter denoting the searching frequency range related to known defect frequency and next, using maximum likelihood mathematical principles, for each test frequency ($v_{fK}$) the maximum likelihood function (J) in time domain is determined using the binary vector (p), checking which test frequency ($v_{fK}$) correlates to a maximum likelihood function value ($J_A$), calculating a ratio ($F_A$) of the maximum value ($J_A$) to a noise level ($n_A$) and comparing said ratio ($F_A$) with a reset threshold parameter ($S_A$): generating information about examined bearing defect with specific frequency that belongs to set ($F_t$) and corresponds to test ($v_{fK}$) if the ratio ($F_A$) is greater than the preset threshold parameter ($S_A$), generating information that no specific defect occurred in the examined bearing or bearings if the ratio ($F_A$) is less than or equal to the preset threshold ($S_A$).

2. A method according to claim 1 wherein the mean square value of the signal in the test interval subjected to $L^{th}$ filtering ($\tau_t[L]$) is determined on the basis of the following relation:

$$\tau_t[L] = \frac{1}{K_t} \sum_{k_t=1}^{K_t} z_t^L[k_t]^2,$$

whereas the mean square value of the signal in the reference interval subjected to $L^{th}$ filtering ($\tau_r[L]$) is determined on the basis of this relation:

$$\tau_r[L] = \frac{1}{K_r} \sum_{k_r=1}^{K_r} z_r^L[k_r]^2,$$

where:
- L—is a natural number from the interval $1 \ldots N_S$ and denotes the number of filters,
- $k_t, k_r$ denotes successive natural numbers 1 to $K_t$ or to $K_r$,
- $z_t^L$, denotes a vector representing the examined test interval of the signal subjected to $L^{th}$ filtering,
- $z_r^L$ denotes a vector representing the examined reference interval of the signal subjected to $L^{th}$ filtering.

3. A method according to claim 2, wherein the mean square value of a signal in the reference interval ($\tau_r[L]$) is determined using $L^{th}$ filtering, that is an adaptive filtering, with use of Singular Value Decomposition (SVD) of autocovariance matrix ($C_r$) according to the following relation:

$$C_r = V\Sigma_r U^T,$$

where matrix ($\Sigma_r$) is a diagonal matrix whose diagonal elements are nonzero and nonnegative and denote mean square values ($\tau_r[L]$):

$$\Sigma_r = \begin{bmatrix} \tau_r[1] & 0 & \ldots & 0 \\ 0 & \tau_r[2] & \ldots & 0 \\ \vdots & \vdots & \ddots & \vdots \\ 0 & 0 & \ldots & \tau_r[L] \end{bmatrix},$$

and matrices (V) and (U) are orthogonal matrices and at the same time the autocovariance matrix ($C_r$) has the following form:

$$C_r = \begin{bmatrix} r[1] & r[2] & \ldots & r[L] \\ r[2] & r[0] & \ldots & r[L-1] \\ \ldots & \ldots & \ldots & \ldots \\ r[L] & r[L-1] & \ldots & r[1] \end{bmatrix},$$

for which:

$$r[i_r] = \frac{1}{K_r} \sum_{k_r=1}^{K_r} x_r[k_r] x_r[k_r + i_r],$$

where:
- $x_r[k_r]$ are the elements of the reference interval,
- $k_r$ denotes successive natural numbers from 1 to $K_r$,
- $i_r$ denotes successive natural numbers from 1 to L,
- $K_r$ denotes the length of the reference interval,
- L denotes the number of adaptive filters.

4. A method according to claim 2, wherein the mean square value of a signal in the test interval ($\tau_t[L]$) is determined using $L^{th}$ filtering, that is an adaptive filtering, on the basis of the following relation:

$$\tau_t[L] = \frac{1}{N_t} \sum_{k_t=1}^{N_t} z_t^L[k_t]^2,$$

where $z_t^L$, are the elements of the matrix $Z_t$ presented in the following form:

$$Z_t = \begin{bmatrix} z_t^1[1] & z_t^1[2] & \ldots & z_t^1[N_t] \\ z_t^1[2] & z_t^1[3] & \ldots & z_t^1[N_t+1] \\ \vdots & \vdots & \ddots & \vdots \\ z_t^L[L_t] & z_t^L[L_t+1] & \ldots & z_t^L[K_t] \end{bmatrix},$$

and calculated according to the following relation:

$$Z_t = X_t U,$$

where matrix ($X_t$) is defined as:

$$X_t = \begin{bmatrix} x_t[1] & x_t[2] & \ldots & x_t[N_t] \\ x_t[2] & x_t[3] & \ldots & x_t[N_t+1] \\ \vdots & \vdots & \ddots & \vdots \\ x_t[L_t] & x_t[L_t+1] & \ldots & x_t[K_t] \end{bmatrix},$$

and matrix (U) is an orthogonal matrix whose elements are the adaptive filter coefficients, while:
- $K_t$ denotes the length of the examined test interval;
- $x_t[k_t]$, are the elements of the test interval;
- $k_t$ denotes the successive natural numbers from 1 to $K_t$,
- $N_t = K_t - L$,
- L denotes the number of adaptive filters.

5. A method according to claim 1, wherein the multiple filtering of signals in said test interval and said reference interval is performed with use of band pass filter.

6. A method according to claim 1, wherein the length of said test interval ($K_t$) is 15% of the length of said reference interval ($K_r$).

7. A method according to claim 1, wherein the test frequency ($v_{fK}$), for which the maximum likelihood function calculated for the binary vector (p) in time domain reaches the maximum value ($J_A$), is determined by maximising the sum of squares of harmonic amplitudes ($A_k$)) according to this relation:

$$J_A = \sum_{k=1}^{N_h} [A_k]^2,$$

where: $N_h$ is a preset number of the examined harmonics.

8. A method according to claim 7, wherein the values of the amplitudes of harmonics ($A_k$) are determined in the time domain using the binary vector (p), presented in the form of the sinusoidal model in which the binary vector (p) is presented as a sum of sinusoidal model and the noise vector:

$$p[n] = \sum_{k=1}^{N_h} [A_k \cos(n\omega_k)\cos(\phi_k) - A_k \sin(n\omega_k)\sin(\phi_k)] + \varepsilon[n],$$

which can be also presented in the following matrix form:

$$p = B\theta + e,$$

where:
- $\phi_k$ is a phase,
- $\omega_k = 2\pi v k / f_s$, $k=1, 2 \ldots N_h$ is an angular velocity corresponding to a test frequency ($v_{fK}$), and $k=1, 2 \ldots N_h$, $f_s$ is a sampling frequency for analogue to digital processing of measured analogue signal,
$e=[\epsilon[n]]^T$ denotes the noise vector,
n—denotes a natural number from 1 to N−1,
N—denotes number of elements in the binary vector (p),
B is the matrix of known constant parameters, presented in the following form:

$$B = \begin{bmatrix} 1 & 0 & 1 & 0 & \cdots & 1 & 0 \\ \cos(\omega_1) & -\sin(\omega_1) & \cos(\omega_2) & -\sin(\omega_2) & \cdots & \cos(\omega_{N_h}) & -\sin(\omega_{N_h}) \\ \cos(\omega_1 2) & -\sin(\omega_1 2) & \cos(\omega_2 2) & -\sin(\omega_2 2) & \cdots & \cos(\omega_{N_h} 2) & -\sin(\omega_{N_h} 2) \\ \vdots & \vdots & \vdots & \vdots & & \vdots & \vdots \\ \cos(\omega_1(N-1)) & -\sin(\omega_1(N-1)) & \cos(\omega_2(N-1)) & -\sin(\omega_2(N-1)) & \cdots & \cos(\omega_{N_h}(N-1)) & -\sin(\omega_{N_h}(N-1)) \end{bmatrix}$$

and θ is the vector of unknown parameters presented in the following form:
$\theta=[A_1 \cos(\phi_1), A_1 \sin(\phi_1), A_2 \cos(\phi_2), A_2 \sin(\phi_2), \ldots, A_{N_k} \cos(\phi_{N_h}), A_{N_h} \sin(\phi_{N_h})]$,
which is the Least Square Estimator for the relation:

$\theta=(B^T B)^{-1} B^T p$ where (p) is a binary vector in this form:
$p=[p[0],p[1],\ldots,p[N-1]]^T$.

9. A method according to claim 1, wherein the noise level ($n_A$) is calculated by taking a median value of maximum function values (J) found in the neighbourhood of the examined defect frequency ($f_{fK}$) from the set ($F_f$).

10. A method according to claim 1, wherein the noise level ($n_A$) is calculated by taking a mean value of maximum function values (J) found in the neighbourhood of the examined defect frequency ($f_{fK}$) from the set ($F_f$).

* * * * *